United States Patent
Yang et al.

(10) Patent No.: US 10,560,947 B2
(45) Date of Patent: Feb. 11, 2020

(54) TERMINAL DEVICE, NETWORK DEVICE, UPLINK REFERENCE SIGNAL SENDING METHOD, AND UPLINK REFERENCE SIGNAL RECEIVING METHOD

(71) Applicant: HUAWEI TECHNOLOGIES CO., LTD., Shenzhen, Guangdong (CN)

(72) Inventors: Xiaodong Yang, Shenzhen (CN); Jian Zhang, Beijing (CN); Yongxia Lyu, Ottawa (CA); Wei Quan, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/928,058

(22) Filed: Mar. 21, 2018

(65) Prior Publication Data
US 2018/0213536 A1 Jul. 26, 2018

Related U.S. Application Data

(63) Continuation of application No. PCT/CN2015/090414, filed on Sep. 23, 2015.

(51) Int. Cl.
*H04W 72/04* (2009.01)
*H04W 52/36* (2009.01)
(Continued)

(52) U.S. Cl.
CPC ..... *H04W 72/0473* (2013.01); *H04W 52/146* (2013.01); *H04W 52/325* (2013.01);
(Continued)

(58) Field of Classification Search
CPC ......... H04W 72/0473; H04W 56/0045; H04W 56/0005; H04W 52/34; H04W 52/325; H04W 52/365; H04W 52/50; H04L 5/001
See application file for complete search history.

(56) References Cited

U.S. PATENT DOCUMENTS

2011/0058505 A1* 3/2011 Pan ............... H04J 11/005
370/280
2013/0107840 A1 5/2013 Ro et al.
(Continued)

FOREIGN PATENT DOCUMENTS

CN 1972257 A 5/2007
CN 101771463 A 7/2010
(Continued)

OTHER PUBLICATIONS

XP050451696 R2-104471 Ericsson, ST Ericsson,"PHR Reporting for CA",3GPP TSG-RAN WG2 #71,Madrid, Spain Aug. 23-27, 2010,total 3 pages.
(Continued)

*Primary Examiner* — Vinncelas Louis
(74) *Attorney, Agent, or Firm* — Womble Bond Dickinson (US) LLP

(57) ABSTRACT

The present disclosure relates to a terminal device, in which a sending module sends, in a first uplink subframe on a first carrier, an uplink reference signal to a network device, where the first carrier is a carrier on which the terminal device sends neither uplink data nor uplink control information in uplink; and a processing module determines a first power headroom PHR, where the first PHR is a PHR of a transmit power of the terminal device in the first uplink subframe or a PHR of a transmit power of the terminal device in the first uplink subframe on the first carrier. Special carriers are introduced, and uplink reference signals are sent on the special carriers, so that information, such as downlink channel characteristics, of these special carriers can be obtained by the network device.

18 Claims, 11 Drawing Sheets

(51) Int. Cl.
*H04W 52/14* (2009.01)
*H04W 52/32* (2009.01)
H04W 52/22 (2009.01)
H04W 52/24 (2009.01)

(52) U.S. Cl.
CPC ........ *H04W 52/365* (2013.01); *H04W 52/228* (2013.01); *H04W 52/242* (2013.01)

(56) References Cited

U.S. PATENT DOCUMENTS

| | | |
|---|---|---|
| 2013/0128856 A1 | 5/2013 | Iwai et al. |
| 2013/0189976 A1 | 7/2013 | Kim et al. |
| 2013/0329660 A1 | 12/2013 | Noh |
| 2014/0219234 A1 | 8/2014 | Kim et al. |
| 2014/0241318 A1 | 8/2014 | Zhong et al. |
| 2015/0358920 A1* | 12/2015 | Sorrentino .......... H04W 52/146 455/522 |
| 2016/0028456 A1 | 1/2016 | Sun et al. |

FOREIGN PATENT DOCUMENTS

| | | |
|---|---|---|
| CN | 102511189 A | 6/2012 |
| CN | 103490872 A | 1/2014 |
| CN | 104104625 A | 10/2014 |
| CN | 104335499 A | 2/2015 |
| WO | 2014/109707 A1 | 7/2014 |

OTHER PUBLICATIONS

3GPP Ts 36331 V12.6.0 (Jun. 2015);3rd Generation Partnership Project;Technical Specification Group Radio Access Network;Evolved Universal Terrestrial Radio Access (E-UTRA);Radio Resource Control (RRC);Protocol specification (Release 12),total 449 pages.
3GPP TS 36321 V12.6.0 (Jun. 2015);3rd Generation Partnership Project;Technical Specification Group Radio Access Network;Evolved Universal Terrestrial Radio Access (E-UTRA);Medium Access Control (MAC) protocol specification (Release 12),total 77 pages.
3GPP TS 36.213 V12.6.0 (Jun. 2015);3rd Generation Partnership Project;Technical Specification Group Radio Access Network;Evolved Universal Terrestrial Radio Access (E-UTRA);Physical layer procedures(Release 12),total 241 pages.
3GPP TS36.213 V9.3.0 (Sep. 2010);3rd Generation Partnership Project;Technical Specification Group Radio Access Network;Evolved Universal Terrestrial Radio Access (E-UTRA);Physical layer procedures(Release 9),total 80 pages.

* cited by examiner

Downlink subframe

Special subframe

Uplink subframe

SRS

| C$_7$ | C$_6$ | C$_5$ | C$_4$ | C$_3$ | C$_2$ | C$_1$ | R |
|---|---|---|---|---|---|---|---|
| P | V | \multicolumn{6}{c}{PH (Type 2, PCell)} |
| R | R | \multicolumn{6}{c}{P$_{CMAX,c}$ 1} |
| P | V | \multicolumn{6}{c}{PH (Type 1, PCell)} |
| R | R | \multicolumn{6}{c}{P$_{CMAX,c}$ 2} |
| P | V | \multicolumn{6}{c}{PH (Type 3, SCell 1)} |
| R | R | \multicolumn{6}{c}{P$_{CMAX,c}$ 3} |

...

| P | V | PH (Type 3, SCell n) |
|---|---|---|
| R | R | P$_{CMAX,c}$ m |

FIG. 6A

| $C_7$ | $C_6$ | $C_5$ | $C_4$ | $C_3$ | $C_2$ | $C_1$ | R |
|---|---|---|---|---|---|---|---|
| P | V | \multicolumn{6}{c}{PH (Type 2, PCell)} |
| R | R | \multicolumn{6}{c}{$P_{CMAX,c}$ 1} |
| P | V | \multicolumn{6}{c}{PH (Type 1, PCell)} |
| R | R | \multicolumn{6}{c}{$P_{CMAX,c}$ 2} |
| P | V | \multicolumn{6}{c}{PH (Type 3, SCell 1)} |
| R | R | \multicolumn{6}{c}{$P_{CMAX,c}$ 3} |

...

| P | V | PH (Type 3, SCell n) |
|---|---|---|
| R | R | $P_{CMAX,c}$ m |

TERMINAL DEVICE, NETWORK DEVICE, UPLINK REFERENCE SIGNAL SENDING METHOD, AND UPLINK REFERENCE SIGNAL RECEIVING METHOD

CROSS-REFERENCE TO RELATED APPLICATIONS

This application is a continuation of International Application No. PCT/CN2015/090414, filed on Sep. 23, 2015, the disclosure of which is hereby incorporated by reference in its entirety.

TECHNICAL FIELD

Embodiments of the present disclosure relate to wireless communications technologies, and in particular, to a terminal device, a network device, an uplink reference signal sending method, and an uplink reference signal receiving method.

BACKGROUND

In a Long Term Evolution (LTE) protocol evolution process, a carrier aggregation (CA) technology is introduced in Release (Release, R) 10. This technology allows user equipment (UE) to send or receive data on a plurality of carriers simultaneously. A network device, such as an evolved NodeB (eNB), selects a cell as a primary cell (Pcell) of the UE, and selects a cell corresponding to another carrier as a secondary cell (Scell) of the UE. The UE may send and receive data in a plurality of aggregated cells. Herein, an LTE system that supports CA is referred to as an LTE CA system.

Referring to FIG. 1, in an LTE CA system, each UE is corresponding to a Pcell and one or more Scells. The Pcell is a cell 1 in FIG. 1, and the one or more Scells include a cell 2 and a cell 3 in FIG. 1. Both the primary cell and the secondary cell can be configured to provide a transmission resource for uplink and/or downlink data transmission between a network device and the UE. The UE receives paging in the Pcell, and can perform a contention-based random access process in the Pcell.

Currently, a typical case is that UE in an LTE CA system supports carrier aggregation of a maximum of five downlink carriers and carrier aggregation of a maximum of two uplink carriers. That is, carrier aggregation of five downlink carriers and one uplink carrier is allowed, and carrier aggregation of five downlink carriers and two uplink carriers is also allowed.

FIG. 2 is a schematic diagram of supporting, by UE, carrier aggregation of two uplink carriers and five downlink carriers in a time division duplex (TDD) LTE system. The UE supports two uplink carriers, and therefore, the UE can work in uplink subframes only on two carriers simultaneously, to send sounding reference signals (SRS). In the TDD LTE system, a time division multiplexing duplex mode is used, and channel characteristics of uplink and downlink channels working on a same carrier are similar and reciprocal. Therefore, if the SRSs are sent in the uplink subframes only on the two carriers, channel characteristics of downlink channels only of the two carriers can be obtained, and downlink channel characteristics of remaining three carriers cannot be obtained from the SRSs that are sent in the uplink subframes.

SUMMARY

In view of this, a terminal device, a network device, an uplink reference signal sending method, and an uplink reference signal receiving method are provided. In a carrier aggregation scenario, a problem that information, such as downlink channel characteristics, of some carriers cannot be obtained when uplink reference signals (such as SRSs) are not sent on these carriers is resolved.

According to a first aspect, an embodiment of the present disclosure provides a terminal device, including:

a sending module, configured to send, in a first uplink subframe on a first carrier, an uplink reference signal to a network device, where the first carrier is a carrier on which the terminal device sends neither uplink data nor uplink control information in uplink; and a processing module, configured to determine a first power headroom (PHR), where the first PHR is a PHR of a transmit power of the terminal device in the first uplink subframe or a PHR of a transmit power of the terminal device in the first uplink subframe on the first carrier.

With reference to the first aspect, in a first possible implementation, the processing module is specifically configured to:

determine an initial power value of the uplink reference signal; and determine the first PHR according to the initial power value of the uplink reference signal.

With reference to the first possible implementation of the first aspect, in a second possible implementation, the terminal device further includes a receiving module, configured to: before the processing module determines the initial power value of the uplink reference signal, receive first indication information sent by the access network device, where the first indication information is used to indicate the initial power value of the uplink reference signal; and the processing module is specifically configured to determine the initial power value of the uplink reference signal according to the first indication information.

With reference to the first aspect, or the first or the second possible implementation of the first aspect, in a third possible implementation, the sending module is further configured to:

send second indication information to the network device, where the second indication information is used to indicate the first PHR.

With reference to the third possible implementation of the first aspect, in a fourth possible implementation, the first PHR is a virtual PHR; and the sending module is further configured to: after the processing module determines the first PHR, send third indication information to the network device, where the third indication information is used to indicate that the PHR indicated by the second indication information is a virtual PHR.

According to a second aspect, an embodiment of the present disclosure provides a network device, including a receiving module and a processing module, where the receiving module is configured to obtain, in a first uplink subframe on a first carrier, an uplink reference signal sent by a terminal device, where the first carrier is a carrier on which the terminal device sends neither uplink data nor uplink control information in uplink; and the receiving module is further configured to receive second indication information sent by the terminal device, where the second indication information is used to indicate a first PHR, where the first PHR is a PHR of a transmit power of the terminal device in the first uplink subframe, and the processing module is configured to determine the PHR of the transmit power of the terminal device in the first uplink subframe according to the second indication information; or the first PHR is a PHR of a transmit power of the terminal device in the first uplink subframe on the first carrier, and the processing module is configured to determine the PHR of the transmit power of the terminal device in the first subframe on the first carrier according to the second indication information.

With reference to the second aspect, in a first possible implementation, the first PHR is determined by the terminal device according to an initial power value of the first uplink reference signal; and the network device further includes a sending module, configured to: before the receiving module receives the first indication information, send first indication information to the terminal device, where the first indication information is used to indicate the initial power value of the uplink reference signal, so that the terminal device determines the initial power value of the uplink reference signal according to the first indication information.

With reference to the second aspect, or the first possible implementation of the second aspect, in a second possible implementation, the first PHR is a virtual PHR, and the receiving module is further configured to:

receive third indication information sent by the terminal device, where the third indication information is used to indicate that the PHR indicated by the second indication information is a virtual PHR.

According to a third aspect, an embodiment of the present disclosure provides a terminal device, including:

a processing module, configured to determine an uplink timing advance (TA) of a second carrier; and a sending module, configured to send an uplink reference signal to a network device on the second carrier according to the TA determined by the processing module, where the second carrier is a carrier on which the terminal device sends neither uplink data nor uplink control information in uplink.

With reference to the third aspect, in a first possible implementation, the sending module is further configured to: before the processing module determines the uplink TA of the second carrier, send a preamble to the network device on the second carrier;

the terminal device further includes a receiving module, configured to receive fourth indication information sent by the network device, where the fourth indication information is used to indicate the uplink TA of the second carrier, and the uplink TA that is of the second carrier and that is indicated by the fourth indication information is determined by the network device according to a receiving status of the preamble; and the processing module is specifically configured to determine the uplink TA of the second carrier according to the fourth indication information received by the receiving module.

With reference to the first possible implementation of the third aspect, in a second possible implementation, the sending module is specifically configured to:

after the receiving module receives a trigger command of the network device, send the preamble to the network device on the second carrier.

With reference to the third aspect, or the first or the second possible implementation of the third aspect, in a third possible implementation, the fourth indication information is in a first random access response (RAR) sent by the network device;

the first RAR is sent to the terminal device by the network device in response to the preamble, and the first RAR further includes uplink grant information; and the processing module is further configured to skip the uplink grant information or determine that an uplink grant value indicated by the uplink grant information is 0.

With reference to the third possible implementation of the third aspect, in a fourth possible implementation, the sending module is further configured to:

before the processing module determines the uplink TA of the second carrier, report fifth indication information to the network device, where the fifth indication information is used to indicate that, the terminal device supports two or more timing advance groups (TAGs) when the terminal device is configured with the special carrier.

According to a fourth aspect, an embodiment of the present disclosure provides a network device, including:

a receiving module, configured to receive a preamble sent by a terminal device on a second carrier; and a processing module, configured to determine an uplink timing advance (TA) of the second carrier according to a receiving status of the preamble received by the receiving module, where the second carrier is a carrier on which the terminal device sends neither uplink data nor uplink control information in uplink.

With reference to the fourth aspect, in a first possible implementation, the network device further includes a sending module, and the sending module is configured to:

after the processing module determines the uplink TA of the second carrier according to the receiving status of the preamble received by the receiving module, send fourth indication information to the terminal device, where the fourth indication information is used to indicate the uplink TA of the second carrier.

With reference to the fourth aspect, or the first possible implementation of the fourth aspect, in a second possible implementation, the sending module is further configured to:

before the receiving module receives the preamble sent by the terminal device on the second carrier, send a trigger command to the terminal device, where the trigger command is used to trigger the terminal device to send the preamble on the special carrier.

With reference to the second possible implementation of the fourth aspect, in a third possible implementation, the receiving module is further configured to:

before the sending module sends the trigger command to the terminal device, receive fifth indication information sent by the terminal device, where the fifth indication information is used to indicate that, the terminal device supports two or more timing advance groups (TAGs) when the terminal device is configured with the special carrier.

According to a fifth aspect, an embodiment of the present disclosure provides an uplink reference signal sending method, including:

sending, by a terminal device in a first uplink subframe on a first carrier, an uplink reference signal to a network device, where the first carrier is a carrier on which the terminal device sends neither uplink data nor uplink control information in uplink; and determining, by the terminal device, a first power headroom (PHR), where the first PHR is a PHR of a transmit power of the terminal device in the first uplink subframe or a PHR of a transmit power of the terminal device in the first uplink subframe on the first carrier.

With reference to the fifth aspect, in a first possible implementation, the determining, by the terminal device, a first PHR includes:

determining, by the terminal device, an initial power value of the uplink reference signal; and determining, by the terminal device, the first PHR according to the initial power value of the uplink reference signal.

With reference to the first possible implementation of the fifth aspect, in a second possible implementation, before the determining, by the terminal device, an initial power value of the uplink reference signal, the method further includes:

receiving, by the terminal device, first indication information sent by the access network device, where the first indication information is used to indicate the initial power value of the uplink reference signal; and the determining, by the terminal device, an initial power value of the uplink reference signal includes:

determining, by the terminal device, the initial power value of the uplink reference signal according to the first indication information.

With reference to the fifth aspect, or the first or the second possible implementation of the fifth aspect, in a third possible implementation, after the determining, by the terminal device, a first PHR, the method further includes:

sending, by the terminal device, second indication information to the network device, where the second indication information is used to indicate the first PHR.

With reference to the third possible implementation of the fifth aspect, in a fourth possible implementation, the first PHR is a virtual PHR; and after the determining, by the terminal device, a first PHR, the method further includes:

sending, by the terminal device, third indication information to the network device, where the third indication information is used to indicate that the PHR indicated by the second indication information is a virtual PHR.

According to a sixth aspect, an embodiment of the present disclosure provides an uplink reference signal receiving method, including:

obtaining, by a network device from a first uplink subframe on a first carrier, an uplink reference signal sent by a terminal device, where the first carrier is a carrier on which the terminal device sends neither uplink data nor uplink control information in uplink; and receiving, by the network device, second indication information sent by the terminal device, where the second indication information is used to indicate a first PHR, where the first PHR is a PHR of a transmit power of the terminal device in the first uplink subframe, and the network device determines the PHR of the transmit power of the terminal device in the first uplink subframe according to the second indication information; or the first PHR is a PHR of a transmit power of the terminal device in the first uplink subframe on the first carrier, and the network device determines the PHR of the transmit power of the terminal device in the first subframe on the first carrier according to the second indication information.

With reference to the sixth aspect, in a first possible implementation, the first PHR is determined by the terminal device according to an initial power value of the uplink reference signal, and before the receiving, by the network device, the first indication information, the method further includes:

sending, by the network device, first indication information to the terminal device, where the first indication information is used to indicate the initial power value of the uplink reference signal, so that the terminal device determines the initial power value of the uplink reference signal according to the first indication information.

With reference to the sixth aspect, or the first possible implementation of the sixth aspect, in a second possible implementation, the first PHR is a virtual PHR, and the method further includes:

receiving, by the network device, third indication information sent by the terminal device, where the third indication information is used to indicate that the PHR indicated by the second indication information is a virtual PHR.

According to a seventh aspect, an embodiment of the present disclosure provides an uplink reference signal sending method, including:

determining, by a terminal device, an uplink timing advance (TA) of a second carrier; and sending, by the terminal device, an uplink reference signal to a network device on the second carrier according to the determined TA, where the second carrier is a carrier on which the terminal device sends neither uplink data nor uplink control information in uplink.

With reference to the seventh aspect, in a first possible implementation, before the determining, by a terminal device, an uplink TA of a second carrier, the method further includes:

sending, by the terminal device, a preamble to the network device on the second carrier; and receiving, by the terminal device, fourth indication information sent by the network device, where the fourth indication information is used to indicate the uplink TA of the second carrier, and the uplink TA that is of the second carrier and that is indicated by the fourth indication information is determined by the network device according to a receiving status of the preamble; and the determining, by a terminal device, an uplink TA of a second carrier includes: determining, by the terminal device, the uplink TA of the second carrier according to the received fourth indication information.

With reference to the first possible implementation of the seventh aspect, in a second possible implementation, the sending, by the terminal device, a preamble to the network device on the second carrier includes:

after receiving a trigger command of the network device, sending, by the terminal device, the preamble to the network device on the second carrier.

With reference to the seventh aspect, or the first or the second possible implementation of the seventh aspect, in a third possible implementation, the fourth indication information is in a first random access response (RAR) sent by the network device;

the first RAR is sent to the terminal device by the network device in response to the preamble, and the first RAR further includes uplink grant information; and the method further includes: skipping, by the terminal device, the uplink grant information or determining that an uplink grant value indicated by the uplink grant information is 0.

With reference to the third possible implementation of the seventh aspect, in a fourth possible implementation, before the determining, by a terminal device, an uplink TA of a second carrier, the method further includes:

reporting, by the terminal device, fifth indication information to the network device, where the fifth indication information is used to indicate that, the terminal device supports two or more TAGs when the terminal device is configured with the special carrier.

According to an eighth aspect, an embodiment of the present disclosure provides an uplink timing advance (TA) determining method, including:

receiving, by a network device, a preamble sent by a terminal device on a second carrier; and determining, by the network device, an uplink timing advance (TA) of the second carrier according to a receiving status of the received preamble, where the second carrier is a carrier on which the terminal device sends neither uplink data nor uplink control information in uplink.

With reference to the eighth aspect, in a first possible implementation, after the determining, by the network device, an uplink TA of the second carrier according to a receiving status of the received preamble, the method further includes:

sending, by the network device, fourth indication information to the terminal device, where the fourth indication information is used to indicate the uplink TA of the second carrier.

With reference to the eighth aspect, or the first possible implementation of the eighth aspect, in a second possible implementation, before the receiving, by a network device, a preamble sent by a terminal device on a second carrier, the method further includes:

sending a trigger command to the terminal device, where the trigger command is used to trigger the terminal device to send the preamble on the special carrier.

With reference to the second possible implementation of the eighth aspect, in a third possible implementation, before the sending, by the network device, the trigger command to the terminal device, the method further includes:

receiving, by the network device, fifth indication information sent by the terminal device, where the fifth indication information is used to indicate that, the terminal device supports two or more timing advance groups (TAGs) when the terminal device is configured with the special carrier.

In the embodiments of the present disclosure, special carriers are introduced, and uplink reference signals are sent on the special carriers, so that information, such as downlink channel characteristics, of these special carriers can be obtained by the network device.

In addition, both a solution for determining a PHR of a special carrier used to send an uplink reference signal and a solution for determining an uplink TA of a special carrier used to send an uplink reference signal are provided.

BRIEF DESCRIPTION OF DRAWINGS

FIG. 6A is a schematic diagram of reporting a carrier-level PHR of a special carrier by a terminal device;

DESCRIPTION OF EMBODIMENTS

Figure 1:
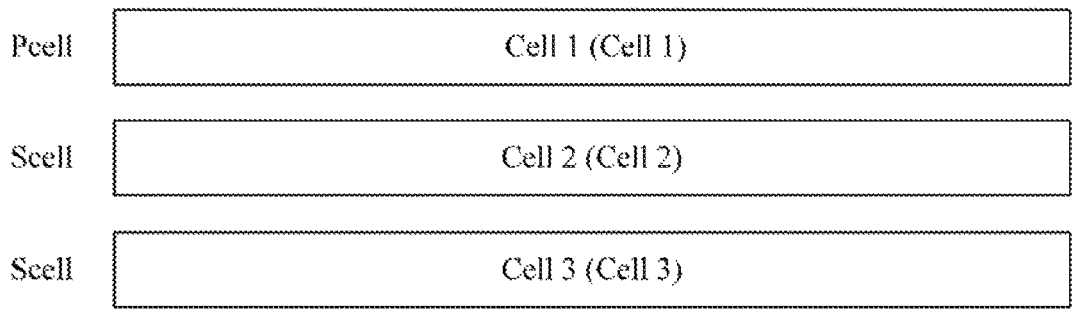
FIG. 1 is a schematic diagram of a principle of carrier aggregation.
Figure 2:
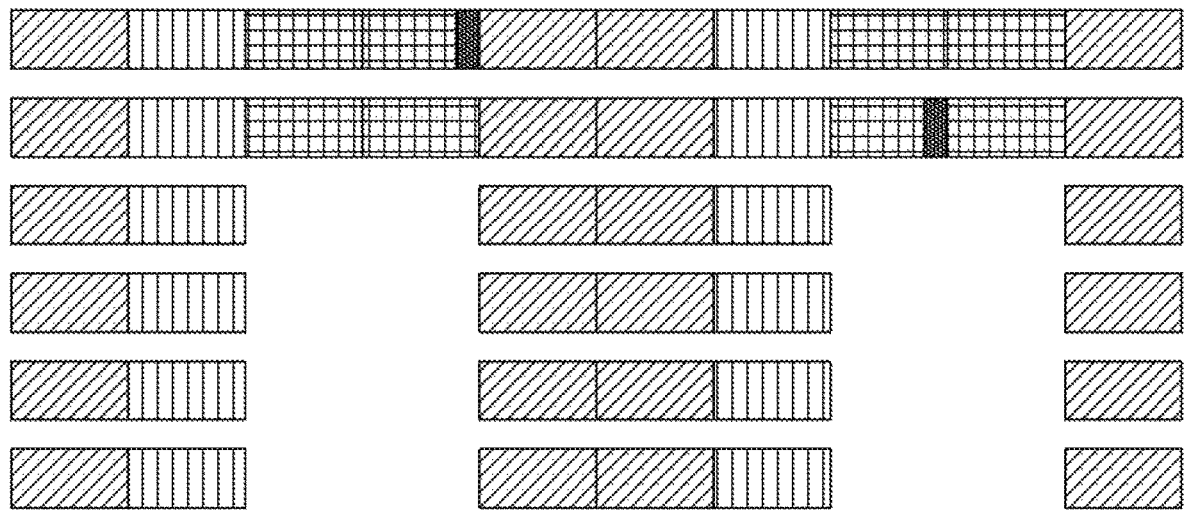
FIG. 2 is a schematic diagram of a manner of sending an SRS in an LTE CA system.
Figure 2:
Figure 2:
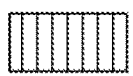
Figure 2:
Figure 2:
Figure 3:
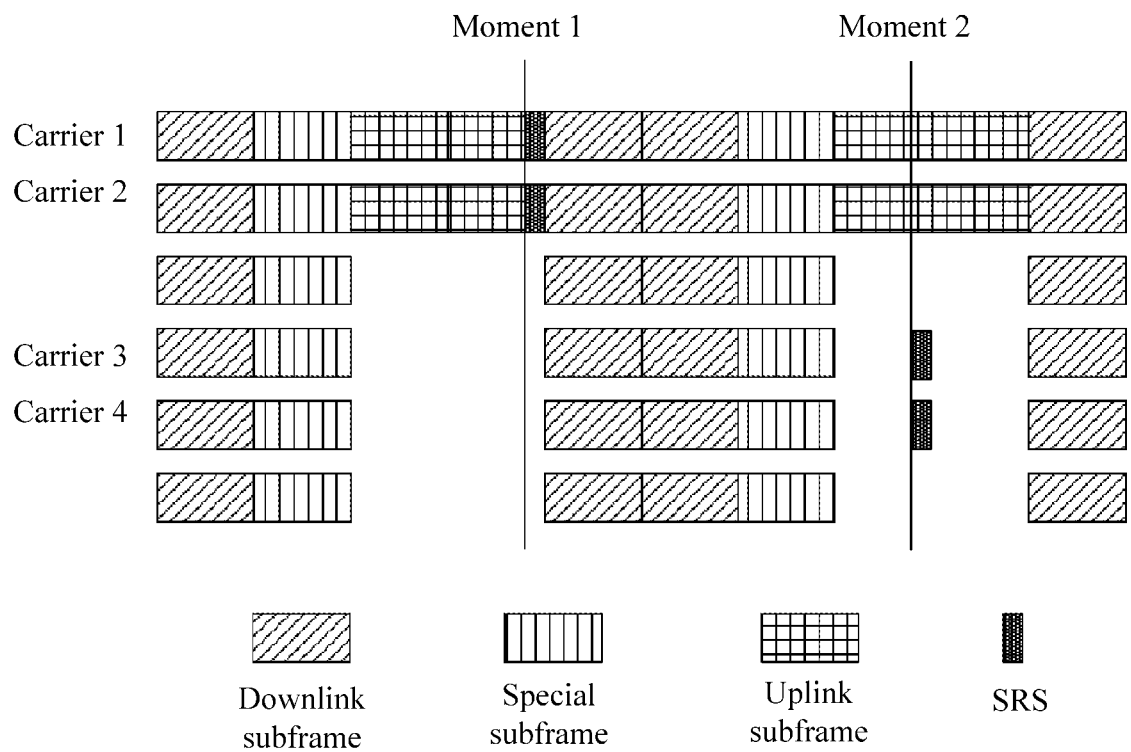
FIG. 3 is a schematic diagram of sending an SRS on a special carrier in an LTE CA system.

Usually, in an LTE CA system, a quantity of uplink carriers supported by UE for simultaneous sending is limited. According to this characteristic that an uplink sending capability is limited, to obtain downlink channel characteristics of, for example, the remaining three carriers in FIG. 2, it may be considered to configure a plurality of uplink carriers for the UE to perform simultaneous sending. A quantity of the plurality of configured uplink carriers exceeds a maximum quantity of uplink carriers supported by the UE for simultaneous sending. Then, the UE sends SRSs on different uplink carriers by means of time division. In this way, sending at a sending moment is still within the uplink sending capability of the UE. For example, in FIG. 3, SRSs are sent on carriers 1 and 2 at a moment 1, and SRSs are sent on carriers 3 and 4 at a moment 2.

If neither uplink data such as a physical uplink shared channel (PUSCH) nor uplink control information such as a physical uplink control channel (PUCCH) is sent in uplink subframes on the carriers 3 and 4, the two carriers are referred to as special carriers, and the remaining carriers are referred to as normal carriers.

The uplink data may be uplink physical layer data and include service data, higher layer signaling, and the like. The uplink control information is physical layer control information, and control information of the uplink control information may be sent by using a physical layer, such as a PUCCH.

Optionally, only an SRS may be sent in an uplink subframe on a special carrier. In this case, the special carrier may be referred to as an uplink SRS only carrier. Optionally, only a preamble may be sent in an uplink subframe on a special carrier. In this case, the special carrier may be referred to as an uplink preamble only carrier. Optionally, both a preamble and an SRS may be sent in an uplink subframe on a special carrier.

However, uplink control information and/or uplink data may be sent in an uplink subframe on a normal carrier. In addition, an uplink signal, such as an SRS or a preamble, may also be sent in the uplink subframe on the normal carrier.

Special carriers are introduced, and uplink reference signals are sent on the special carriers, so that information, such as downlink channel characteristics, of these special carriers can be obtained by a network device.

However, how to obtain power headrooms (PHR) of these special carriers used to send uplink reference signals and how to determine uplink timing advances (TA) of these special carriers used to send the uplink reference signals are problems that still need to be resolved.

In the embodiments of the present disclosure, both a solution for determining a PHR of a special carrier used to send an uplink reference signal and a solution for determining an uplink TA of a special carrier used to send an uplink reference signal are provided.

The following provides detailed descriptions with reference to the accompanying drawings.

The terms "system" and "network" may be used interchangeably in the embodiments of the present disclosure. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

Figure 4:
FIG. 4 is a schematic structural diagram of a wireless communications system according to an embodiment of the present disclosure.

FIG. 4 is a schematic structural diagram of a wireless communications system according to an embodiment of the present disclosure. As shown in FIG. 4, the system includes a terminal device 401 and a network device 402. The terminal device 401 is configured to perform uplink sending, and the network device 402 is configured to perform uplink receiving.

Communications standards of the wireless communications system shown in FIG. 4 include but are not limited to: Global System for Mobile Communications (GSM), Code Division Multiple Access (CDMA) IS-95, Code Division Multiple Access (CDMA) 2000, Time Division-Synchronous Code Division Multiple Access (TD-SCDMA), Wideband Code Division Multiple Access (WCDMA), Time Division Duplex-Long Term Evolution (TDD LTE), Frequency Division Duplex-Long Term Evolution (FDD LTE), Long Term Evolution-Advanced (LTE-advanced), Personal Handy-phone System (PHS), Wireless Fidelity (WiFi) stipulated in 802.11 series protocols, Worldwide Interoperability for Microwave Access (WiMAX), and various future evolved wireless communications systems.

The embodiments of the present disclosure can be applied to any wireless communications system that supports carrier aggregation for uplink sending simultaneously performed on a plurality of carriers, to resolve a problem that information, such as a downlink channel characteristic, cannot be obtained because uplink reference signals are not sent on some carriers. In addition, a problem that simultaneously performing uplink sending on a normal carrier and a special carrier may be beyond an uplink sending capability of a terminal device can be avoided.

The terminal device 401 may be a wireless terminal. The wireless terminal may be a device that provides voice and/or data connectivity for a user, a handheld device with a wireless connection function, or another processing device connected to a wireless modem. The wireless terminal may communicate with one or more core networks by using a radio access network (for example, RAN, Radio Access Network). The wireless terminal may be a mobile terminal, such as a mobile phone (or referred to as a "cellular" phone) or a computer with a mobile terminal. For example, the wireless terminal may be a portable, pocket-sized, handheld, computer built-in, or in-vehicle mobile apparatus. The mobile apparatus exchanges voice and/or data with the radio access network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a subscriber unit, a subscriber station, a mobile station, a remote station, an access point, a remote terminal, an access terminal, a user terminal, a user agent, a user device, or user equipment.

The network device 402 may include a base station or a radio resource management device configured to control a base station, or may include a base station and a radio resource management device configured to control the base station. The base station may be a macro base station, or a small base station such as a small cell base station or a pico cell base station. Alternatively, the base station may be a home base station such as a home NodeB (HNB) or a home evolved NodeB (HeNB). Alternatively, the base station may include a relay node (relay) or the like.

For example, in an LTE system such as a TDD LTE system or an LTE-A system, the network device 402 in the wireless communications system provided in this embodiment of the present disclosure may be an evolved NodeB (eNodeB), and the terminal device 401 may be UE. In a TD-SCDMA system or a WCDMA system, the network device 402 in the wireless communications system provided in this embodiment of the present disclosure may be a NodeB and/or a radio network controller (RNC), and the terminal device 401 may be UE.

The following separately describes an optional solution for determining a PHR of a special carrier used to send an uplink reference signal, and an optional solution for determining an uplink TA of a special carrier used to send an uplink reference signal.

[Optional Solution for Determining a PHR]

Figure 5:
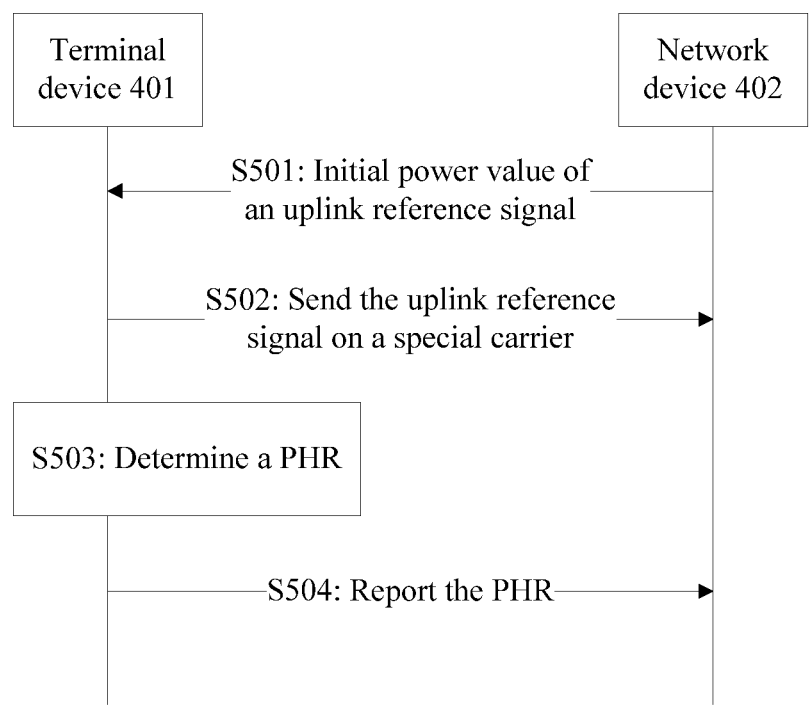
FIG. 5 is a flowchart of an optional solution for determining a PHR according to an embodiment of the present disclosure.

Referring to a procedure shown in FIG. 5, the following describes an optional procedure including the following steps: The terminal device 401 sends an uplink reference signal; the network device 402 receives the uplink reference signal; the terminal device 401 determines and reports a PHR; and the network device 402 determines a value of the PHR according to the PHR reported by the terminal device 401. As shown in FIG. 5, the procedure may include the following steps.

S501: The network device 402 sends an initial power value of the uplink reference signal to the terminal device 401.

Step S501 is an optional step. The network device 402 may send the initial power value by using higher layer signaling such as radio resource control (RRC) signaling, for example, send indication information used to indicate the initial power value. The network device 402 may alternatively send an initial power value of a physical uplink shared channel PUSCH. In this case, the terminal device 401 may use the received initial power value of the PUSCH as the initial power value of the uplink reference signal.

After receiving the indication information, the terminal device 401 determines the initial power value of the uplink reference signal according to the indication information.

S502: The terminal device 401 sends the uplink reference signal to the network device 402 in an uplink subframe on a special carrier.

In step S502, the terminal device 401 sends the uplink reference signal to the network device 402 in an uplink subframe on a carrier. The carrier is a carrier on which the terminal device 401 sends neither uplink data nor uplink control information in uplink, that is, the carrier is the special carrier described above.

Optionally, the terminal device 401 may set an initial transmit power of the uplink reference signal according to the initial power value that is indicated by the indication information and that is received in step S501, to send the uplink reference signal in uplink.

S503: The terminal device 401 may determine a PHR related to the uplink subframe according to the initial power value of the uplink reference signal.

Optionally, the terminal device 401 may obtain the indication information from the higher layer signaling sent by the network device 402 in step S502, determine the initial power value of the uplink reference signal according to the indication information, and determine the PHR according to the determined initial power value.

S504: The terminal device 401 sends the determined PHR to the network device 402.

For example, the PHR is sent by using physical layer signaling, Media Access Control (MAC) layer signaling, or higher layer signaling (such as RRC signaling). The signaling carries indication information used to indicate the PHR, and is sent to the network device 402.

The network device 402 obtains, from the signaling, the indication information used to indicate the PHR, and determines the PHR according to the indication information.

The following separately describes step S503 and step S504 in detail.

In step S503, the terminal device 401 may determine a UE-level PHR or a carrier-level PHR.

The UE-level PHR is a PHR of a transmit power of the terminal device 401 in the uplink subframe. That is, all carriers that are used by the terminal device 401 for performing uplink sending in the uplink subframe are considered.

The carrier-level PHR is a PHR of a transmit power of the terminal device 401 in the uplink subframe on the uplink carrier. Only one carrier that is used by the terminal device 401 for performing uplink sending in the uplink subframe is considered.

The PHR may be a real PHR or a virtual PHR.

The real PHR is a PHR obtained through calculation when uplink sending is really performed.

The virtual PHR is a PHR obtained through calculation when uplink sending is not performed but it is assumed that uplink sending is performed. The terminal device 401 may send the virtual PHR to the network device 402, so that the network device 402 performs power allocation between carriers according to the received virtual PHR.

Methods for calculating the virtual PHR and the real PHR may be the same or different.

Using an example in which the uplink reference signal is an SRS, the following describes a method for determining the PHR by the terminal device 401. The determining method is applicable to both the real PHR and the virtual PHR, unless otherwise specified.

Currently, an LTE protocol defines LTE and defines a PUSCH PHR, referred to as a type 1 PHR, and defines a PUSCH+PUCCH PHR, referred to as a type 2 PHR. Herein, a PHR including uplink sending in an uplink subframe on a special carrier is defined as a type 3 PHR.

1. Carrier-level PHR

The terminal device 401 sends only the SRS on the special carrier, and a PHR obtained when the terminal device 401 sends the SRS in an uplink subframe i on the special carrier is defined as:

$$PH_{type3}(i) = P_{CMAX}(i) - \{P_{SRS\_OFFSET}(m) + 10 \log_{10}(M_{SRS,c}) + P_{O\_SRS,c} + \alpha_c(j) \cdot PL + f(i)\}$$

In the formula, factors such as different SRS trigger types, an SRS bandwidth, an initial target power of the SRS, and a path loss are mainly considered.

i is an uplink subframe number. $P_{CMAX}(i)$ is a maximum transmit power allowed to be set for the terminal device 401 in the uplink subframe i of the special subframe. m=0 or m=1 in $P_{SRS\_OFFSET}(m)$ is configured in a semi-persistent manner by using higher layer signaling, for example, is notified by the network device 402 to the terminal device 401 by using higher layer signaling. In addition, a value of m remains unchanged unless higher layer signaling is sent again to configure the value. m=0 represents an SRS trigger type 0, and m=1 represents an SRS trigger type 1. $M_{SRS,c}$ is an SRS transmission bandwidth on the special carrier. $P_{O\_SRS,c}$ is the initial power value of the SRS on the special carrier, and is carried in higher layer signaling, for example, is notified by the network device 402 to the terminal device 401 by using higher layer signaling. f(i) is a correction value of the terminal device 401 based on a transmission power control (TPC) power control command. $\alpha_c(j)$ is a path loss compensation factor. PL is a downlink path loss measured by the terminal device 401.

When j=0 or 1, $\alpha_c(j) \in \{0, 0.4, 0.5, 0.6, 0.7, 0.8, 0.9, 1\}$ is a path loss compensation factor, of the special carrier, that is notified by using three bits in higher layer signaling.

When j=2, $\alpha_c(j)=1$.

j=0 is used in semi-persistent scheduling PUSCH initial transmission/retransmission; j=1 is used in dynamic scheduling PUSCH initial transmission/retransmission; and j=2 is used in PUSCH transmission corresponding to a random access response.

2. UE-Level PHR

The following uses an example in which the terminal device 401 has an uplink sending capability of supporting simultaneous sending on a maximum of two uplink carriers for description.

(1) SRS+PUCCH (that is, sending a PUCCH on a normal carrier, and sending an SRS on a special carrier)

A PHR of the terminal device 401 in an uplink subframe i is:

$$PH_{type3}(i) = P_{CMAX}(i) - 10 \log_{10} \left( \begin{array}{l} 10^{(P_{SRS\_OFFSET}(m) + 10 \log_{10}(M_{SRS}) + P_{O\_SRS} + \alpha(j) \cdot PL + f(i))/10} \\ + 10^{(P_{0\_PUCCH} + PL + h(n_{CQI}, n_{HARQ}, n_{SR}) + \Delta_{F\_PUCCH}(F) + \Delta_{TxD}(F') + g(i))/10} \end{array} \right),$$

where i is an uplink subframe number; $P_{CMAX}^{(i)}$ is maximum transmit power allowed to be set for the terminal device 401 in the uplink subframe i; m=0 or m=1 in $P_{SRS\text{-}OFFSET}(m)$ is configured in a semi-persistent manner by using higher layer signaling, where m=0 represents an SRS trigger type 0, and m=1 represents an SRS trigger type 1; $M_{SRS}$ is an SRS transmission bandwidth; and $n_{CQI}$, $n_{HARQ}$, and $n_{SR}$ are quantities of bits of a channel quality indicator (CQI), a hybrid automatic repeat request acknowledgement (HARQ-ACK), and a scheduling request (SR) that are to be fed back, respectively;

$$h(n_{CQI}, n_{HARQ}, n_{SR}) = \begin{cases} 10 \log_{10}\left(\frac{n_{CQI} + n_{HARQ}}{4}\right) & \text{if } n_{CQI} + n_{HARQ} \geq 4; P_{O\_SRS} \\ 0 & \text{others} \end{cases}$$

value of the SRS and is carried in higher layer signaling, for example, is notified by the network device 402 to the terminal device 401 by using higher layer signaling; f(i) is a correction value of the terminal device 401 based on a TPC power control command; and $\alpha(j)$ is a path loss compensation factor.

When j=0 or 1, $\alpha(j) \in \{0, 0.4, 0.5, 0.6, 0.7, 0.8, 0.9, 1\}$ is a path loss compensation factor, of the special carrier, that is notified by using three bits in higher layer signaling.

When j=2, $\alpha(j)=1$.

j=0 is used in semi-persistent scheduling PUSCH initial transmission/retransmission; j=1 is used in dynamic scheduling PUSCH initial transmission/retransmission; and j=2 is used in PUSCH transmission corresponding to a random access response.

PL is a downlink path loss measured by the terminal device 401. $P_{O\_PUCCH}(j)$ is a PUCCH initial power value and is carried in higher layer signaling. $\Delta_{F\_PUCCH}(F)$ is a power adjustment value according to different PUCCH formats. $\Delta_{TxD}(F')$ is a power adjustment value according to different modulation and coding schemes (MCS). g(i) is a correction value based on a TPC power control command. F represents different PUCCH formats.

(2) SRS+PUSCH (that is, sending a PUSCH on a normal carrier, and sending an SRS on a special carrier).

A PHR of the terminal device 401 in an uplink subframe i is:

$$PH_{type3}(i) = P_{CMAX}(i) - 10 \log_{10} \begin{pmatrix} 10^{(P_{SRS\_OFFSET}(m) + 10 \log_{10}(M_{SRS}) + P_{O\_SRS} + \alpha(j) \cdot PL + f(i))/10} \\ + 10^{(P_{O\_PUCCH} + PL + h(n_{CQI}, n_{HARQ}, n_{SR}) + \Delta_{F\_PUCCH}(F) + \Delta_{TxD}(F') + g(i))/10} \end{pmatrix}$$

where i is an uplink subframe number; $P_{CMAX}(i)$ is maximum transmit power allowed to be set for the terminal device 401 in the uplink subframe i; m=0 or m=1 in $P_{SRS\_OFFSET}(m)$ is configured in a semi-persistent manner by using higher layer signaling, where m=0 represents an SRS trigger type 0, and m=1 represents an SRS trigger type 1; $M_{SRS}$ is an SRS transmission bandwidth; $P_{O\_SRS}$ is an initial power value of the SRS and is carried in higher layer signaling, for example, is notified by the network device 402 to the terminal device 401 by using higher layer signaling; f(i) is a correction value of the terminal device 401 based on a TPC power control command; and $\alpha(j)$ is a path loss compensation factor.

When j=0 or 1, $\alpha(j) \in \{0, 0.4, 0.5, 0.6, 0.7, 0.8, 0.9, 1\}$ is a path loss compensation factor, of the special carrier, that is notified by using three bits in higher layer signaling.

When j=2, $\alpha(j)=1$.

j=0 is used in semi-persistent scheduling PUSCH initial transmission/retransmission; j=1 is used in dynamic scheduling PUSCH initial transmission/retransmission; and j=2 is used in PUSCH transmission corresponding to a random access response.

PL is a downlink path loss measured by the terminal device 401. $P_{O\_PUSCH}(i)$ is a PUSCH initial power value and is carried in higher layer signaling. Different values of j correspond to different transmission modes.

For example, for a PUSCH bearing persistent scheduling and non-adaptive retransmission, j=0; for a PUSCH bearing dynamic scheduling and adaptive retransmission, j=1; and for a PUSCH bearing a random access message 3, j=2. $\Delta_{TF}(i)$ is a power adjustment value according to different modulation and coding schemes (MCS).

The following describes step S401. In step S401, the terminal device 401 may report the PHR by using the higher layer signaling, the MAC signaling, or the physical layer signaling. Herein, an example in which the PHR is reported by using a MAC control element (CE) is used for description.

For the MAC CE, a new type 3 report format may be introduced. As shown in the following figure, only a type 3 PHR is reported for a special carrier.

Figure 6B:
FIG. 6B is a schematic diagram of reporting a type 1 or type 2 virtual PHR of a special carrier by a terminal device.

A manner of reporting the carrier-level PHR by the terminal device 401 may be shown in FIG. 6A.

In FIG. 6A, a PH (Type 3, SCell 1) and a PH (Type 3, SCell n) are carrier-level PHRs that are of special carriers and that are reported by the terminal device 401. PCell represents a primary cell, and SCell represents a secondary cell. $C_7$ to $C_1$ are separately used to indicate whether a PHR is reported on a corresponding carrier. A value 1 represents that a PHR is reported on a corresponding carrier, and a value 0 represents that no PHR is reported on a corresponding carrier. R represents a reserved bit. P is used to indicate whether power back-off is applied to PHR calculation. A value 0 represents that no power back-off is applied, and a value 1 represents that power back-off is applied. V represents whether a corresponding PHR is a real PHR or a virtual PHR. $P_{CMAX,c}$ 1 to $P_{CMAX,c}$ m each represents a maximum transmit power on a corresponding carrier.

If the reported PHR is a virtual PHR, a bit V in a PHR MAC CE may be set to 1 to identify that a virtual PHR is reported.

The terminal device 401 may send a virtual PHR for a special carrier. In this manner, no type 3 PHR needs to be introduced. An existing PHR MAC CE already supports this manner. For details, refer to FIG. 6B. A bit V is set to 1 to indicate whether a PHR is a virtual type 1 or type 2 PHR. Bits V corresponding to an underlined PH (Type 1, SCell 1) and PH (Type 1, SCell n) are fixedly set to 1, representing that a virtual PHR is sent for a special carrier. After receiving the MAC CE, the network device 402 may determine, according to a value of V, that a virtual PHR is received.

Alternatively, a type 3 PHR may be introduced. A specific reporting method may be shown in FIG. 6C. V is set to 1. After receiving the MAC CE, the network device 402 may determine, according to a value of V, that a virtual PHR is received.

[Optional Solution for Determining a TA]

Figures 6C, 7:
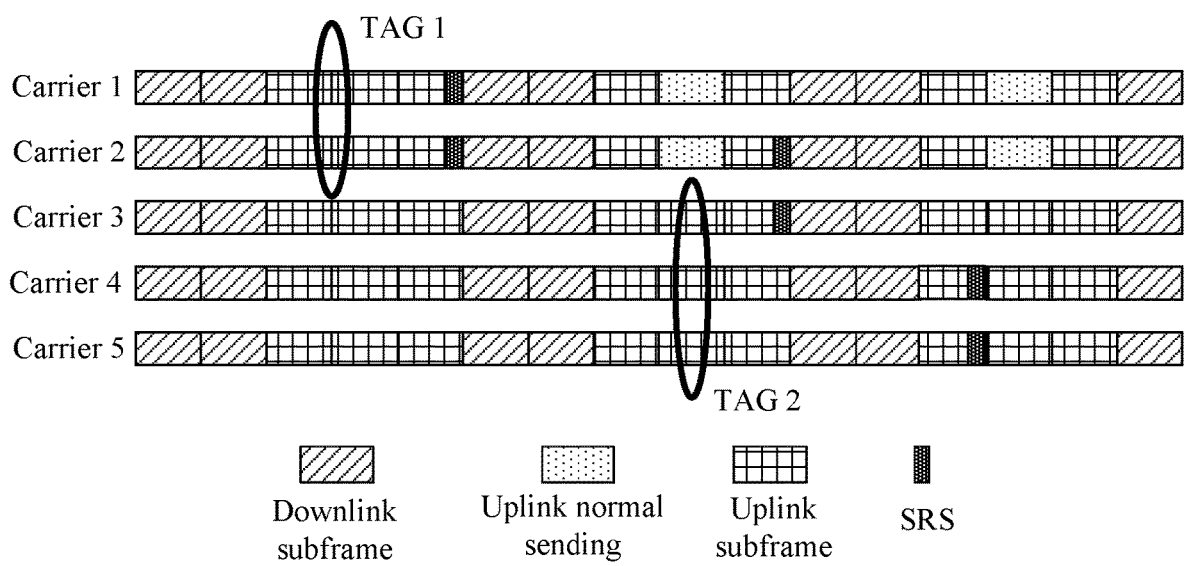
FIG. 6C is a schematic diagram of reporting a type 3 virtual PHR of a special carrier by a terminal device.
FIG. 7 is a schematic diagram of a special carrier and a normal carrier belonging to different timing advance groups (TAG)

When a special carrier and a normal carrier belong to different timing advance groups (TAG), the network device 402 needs to obtain an uplink TA of the special carrier. As shown in FIG. 7, carriers 1 and 2 are normal carriers and belong to a TAG 1, and carriers 3, 4, and 5 are special carriers and belong to a TAG 2. When learning that the special carriers and the normal carriers that are used by the terminal device 401 belong to the TAG 1 and the TAG 2, respectively, the network device 402 determines that uplink TAs of the special carriers need to be obtained.

Figure 8:
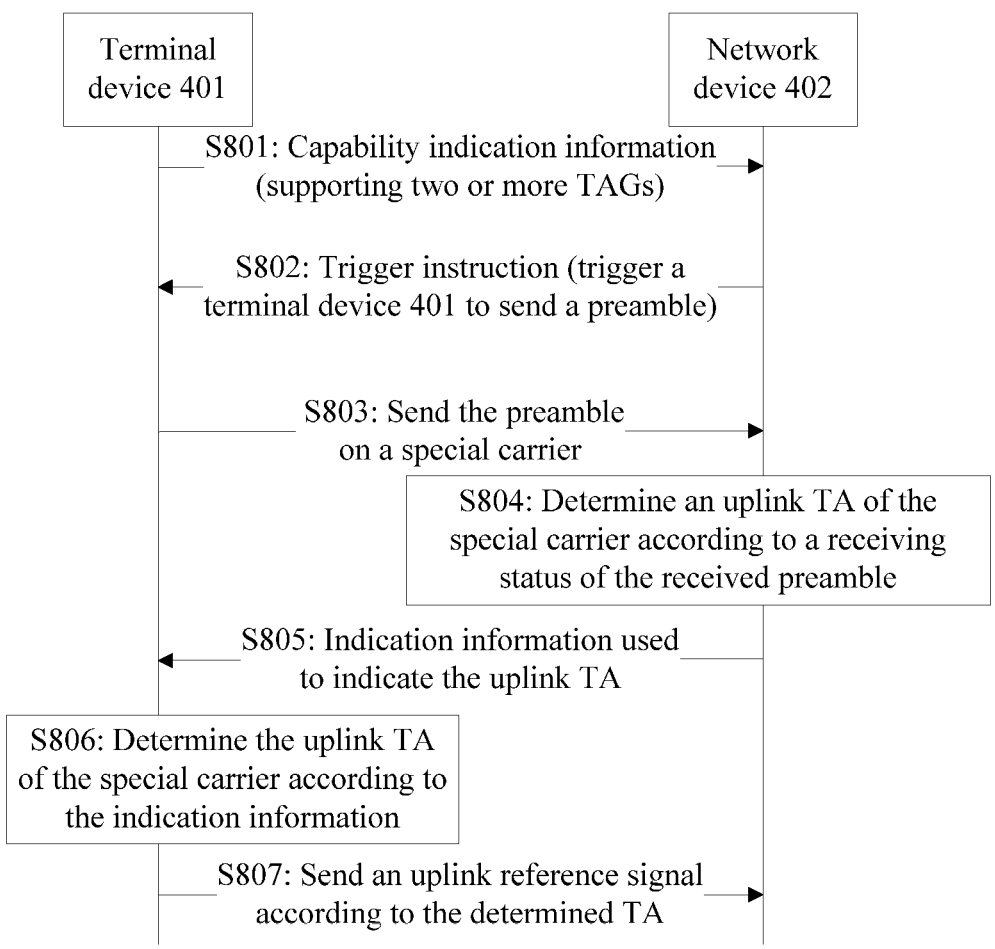
FIG. 8 is a flowchart of an optional solution for determining a TA according to an embodiment of the present disclosure.

Referring to a procedure shown in FIG. 8, the following describes an optional solution including the following steps: The terminal device 401 sends a preamble on a special carrier; the network device 402 determines an uplink TA of the special carrier according to the received preamble, and notifies the terminal device 401; and the terminal device 401 obtains the uplink TA, and sends an uplink reference signal on the special carrier according to the obtained uplink TA.

The procedure shown in FIG. 8 includes the following steps.

S801: The terminal device 401 sends capability indication information to the network device 402, to indicate that, the terminal device 401 supports two or more TAGs when the terminal device 401 is configured with the special carrier.

When the special carrier and a normal carrier belong to different TAGs, the terminal device 401 needs to maintain TAs of more TAGs, and the terminal device 401 further needs to report, to the network device 402, a capability of a TAG supported by the terminal device 401. Optionally, even though the terminal device 401 can perform uplink sending only on one carrier at a same moment, the terminal device 401 still needs to support a capability of maintaining TAs of two or more TAGs.

S802: The network device 402 sends a trigger command to the terminal device 401, to instruct the terminal device 401 to send a preamble on the special carrier.

A RACH resource used by the terminal device 401 to send the preamble may be preconfigured by the network device 402 for the terminal device 401 after the network device 402 configures the special carrier for the terminal device 401.

The network device 402 determines, according to the received capability indication information, that, the terminal device 401 supports two or more TAGs when the terminal device is configured with the special carrier. Then, when the special carrier is configured for the terminal device 401, if the special carrier and the normal carrier belong to different TAGs, the network device 402 sends the trigger command to the terminal device 401, to trigger the terminal device 401 to send the preamble on the special carrier.

Alternatively, when the special carrier is configured for the terminal device 401, the network device 402 may send the trigger command to the terminal device 401, to instruct the terminal device 401 to send the preamble on the special carrier. When determining, according to the preamble received on the special carrier, that a difference between a TA of the special carrier and a TA of the normal carrier is relatively great, for example, greater than a preset threshold, the network device 402 may determine that the special carrier and the normal carrier belong to different TAGs.

The trigger command may be sent by using a PDCCH.

S803: The terminal device 401 sends, on the special carrier, the preamble to the network device 402 on a RACH resource configured by the network device 402.

Optionally, the terminal device 401 may be triggered by receiving a PDCCH instruction sent by the network device 402, to send the preamble on the special carrier.

Optionally, when the special carrier and the normal carrier belong to different TA groups (TAG), the terminal device 401 may determine that an uplink TA of the special carrier needs to be obtained. Specifically, the terminal device 401 may obtain the TA by sending the preamble to the network device 402 on the special carrier.

S804: The network device 402 determines an uplink TA of the special carrier according to a receiving status of the received preamble, for example, the network device 402 determines the uplink TA of the special carrier according to a timing relationship between two moments, that is, a receiving moment of the received preamble and a downlink sending moment at which the network device 402 performs downlink sending.

S805: The network device 402 sends, to the terminal device 401, indication information used to indicate the uplink TA.

For example, the indication information is carried in a random access response (RAR), to indicate the uplink TA. A message format may be shown in FIG. 9. A timing advance command in the message is used to indicate the uplink TA.

Figure 9:
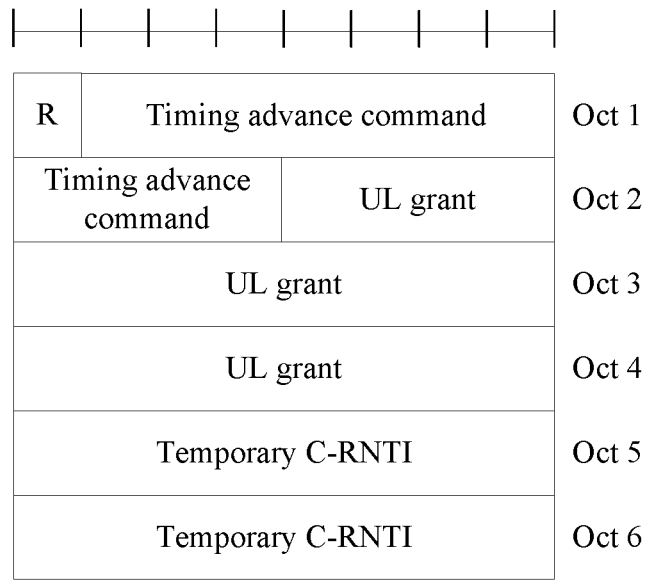
FIG. 9 is a schematic diagram of adding a TA to a random access response (RAR) message by a network device according to an embodiment of the present disclosure.

The message in FIG. 9 includes multiple octets (Oct) 1 to 6. R is a reserved bit, Oct 5 and Oct 6 are temporary cell-radio network temporary identifiers (C-RNTI). After receiving the RAR, the terminal device 401 may skip uplink grant carried in the RAR or determine that an uplink grant value indicated by the uplink grant is 0.

S806: The terminal device 401 determines the uplink TA according to the indication information.

If the network device 402 sends the uplink TA by using the RAR, the terminal device 401 may obtain, from the RAR, the indication information used to indicate the uplink TA, and determine the uplink TA according to the indication information.

S807: The terminal device 401 sends, according to the determined uplink TA, an uplink reference signal to the network device 402 on the special carrier.

Figure 10:
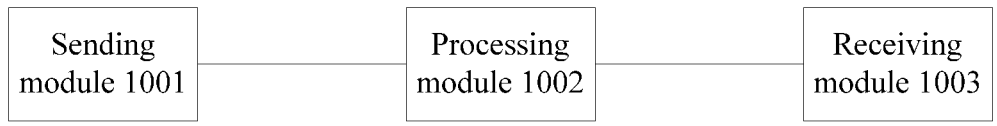
FIG. 10 is a schematic structural diagram of a first terminal device according to an embodiment of the present disclosure.

FIG. 10 is a schematic structural diagram of a first terminal device according to an embodiment of the present disclosure. As shown in FIG. 10, the terminal device includes:

a sending module 1001, configured to send, in a first uplink subframe on a first carrier, an uplink reference signal to a network device, where the first carrier is a carrier on which the terminal device sends neither uplink data nor uplink control information in uplink; and a processing module 1002, configured to determine a first power headroom PHR, where the first PHR is a PHR of a transmit power of the terminal device in the first uplink subframe or a PHR of a transmit power of the terminal device in the first uplink subframe on the first carrier.

Optionally, the processing module 1002 is specifically configured to:

determine an initial power value of the uplink reference signal; and determine the first PHR according to the initial power value of the uplink reference signal.

Optionally, the terminal device further includes a receiving module 1003, configured to: before the processing module 1002 determines the initial power value of the uplink reference signal, receive first indication information sent by the access network device. The first indication information is used to indicate the initial power value of the uplink reference signal.

The processing module 1002 is specifically configured to determine the initial power value of the uplink reference signal according to the first indication information.

Optionally, the sending module 1001 is further configured to:

send second indication information to the network device, where the second indication information is used to indicate the first PHR.

Optionally, the first PHR is a virtual PHR.

The sending module 1001 is further configured to: after the processing module 1002 determines the first PHR, send third indication information to the network device. The third indication information is used to indicate that the PHR indicated by the second indication information is a virtual PHR.

For a communications standard of a wireless communications system in which the terminal device is located, refer to the wireless communications system shown in FIG. 4. For various types of the terminal device, refer to the various types of the terminal device 401 described above.

For another optional implementation of the sending module 1001, refer to a sending operation of the terminal device 401 in [Optional solution for determining a PHR] in the wireless communications system shown in FIG. 4. For another optional implementation of the processing module 1002, refer to processing and control operations of the terminal device 401 in [Optional solution for determining a PHR] in the wireless communications system shown in FIG. 4. For another optional implementation of the receiving module 1003, refer to a receiving operation of the terminal device 401 in [Optional solution for determining a PHR] in the wireless communications system shown in FIG. 4. For an optional implementation of determining a PHR by the processing module 1002, refer to the solution for determining a PHR by the terminal device 401 in [Optional solution for determining a PHR] in the wireless communications system shown in FIG. 4.

The sending module 1001 may be implemented by a transmitter. The processing module 1002 may be implemented by a processor. The receiving module 1003 may be implemented by a receiver.

Figure 11:
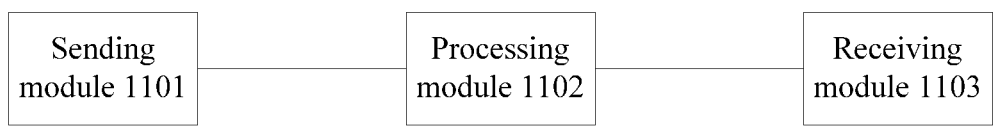
FIG. 11 is a schematic structural diagram of a first network device according to an embodiment of the present disclosure.

FIG. 11 is a schematic structural diagram of a first network device according to an embodiment of the present disclosure. As shown in FIG. 11, the network device includes a receiving module 1103 and a processing module 1102.

The receiving module 1103 is configured to obtain, in a first uplink subframe on a first carrier, an uplink reference signal sent by a terminal device. The first carrier is a carrier on which the terminal device sends neither uplink data nor uplink control information in uplink.

The receiving module 1103 is further configured to receive second indication information sent by the terminal device. The second indication information is used to indicate a first PHR.

The first PHR is a power headroom (PHR) of a transmit power of the terminal device in the first uplink subframe, and the processing module 1102 is configured to determine the PHR of the transmit power of the terminal device in the first uplink subframe according to the second indication information.

Alternatively, the first PHR is a PHR of a transmit power of the terminal device in the first uplink subframe on the first carrier, and the processing module 1102 is configured to determine the PHR of the transmit power of the terminal device in the first subframe on the first carrier according to the second indication information.

Optionally, the first PHR is determined by the terminal device according to an initial power value of the uplink reference signal.

The network device further includes a sending module 1101, configured to: before the receiving module 1103 receives the first indication information, send first indication information to the terminal device. The first indication information is used to indicate the initial power value of the uplink reference signal, so that the terminal device determines the initial power value of the uplink reference signal according to the first indication information.

Optionally, the first PHR is a virtual PHR, and the receiving module 1103 is further configured to:

receive third indication information sent by the terminal device, where the third indication information is used to indicate that the PHR indicated by the second indication information is a virtual PHR.

For a communications standard of a wireless communications system in which the network device is located, refer to the wireless communications system shown in FIG. 4. For various types of the network device, refer to the various types of the network device 402 described above.

For another optional implementation of the sending module 1101, refer to a sending operation of the network device 402 in [Optional solution for determining a PHR] in the wireless communications system shown in FIG. 4. For another optional implementation of the processing module 1102, refer to processing and control operations of the network device 402 in [Optional solution for determining a PHR] in the wireless communications system shown in FIG. 4. For another optional implementation of the receiving module 1103, refer to a receiving operation of the network device 402 in [Optional solution for determining a PHR] in the wireless communications system shown in FIG. 4.

The sending module 1101 may be implemented by a transmitter. The processing module 1102 may be implemented by a processor. The receiving module 1103 may be implemented by a receiver.

Figure 12:
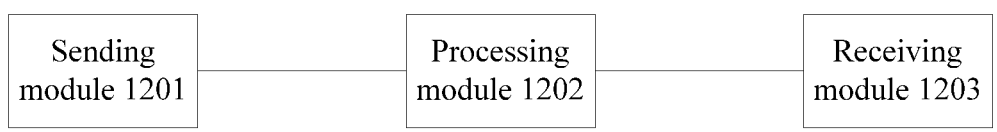
FIG. 12 is a schematic structural diagram of a second terminal device according to an embodiment of the present disclosure.

FIG. 12 is a schematic structural diagram of a second terminal device according to an embodiment of the present disclosure. As shown in FIG. 12, the terminal device includes:

a processing module 1202, configured to determine an uplink timing advance (TA) of a second carrier; and a sending module 1201, configured to send an uplink reference signal to a network device on the second carrier according to the TA determined by the processing module 1202.

The second carrier is a carrier on which the terminal device sends neither uplink data nor uplink control information in uplink.

Optionally, the sending module 1201 is further configured to: before the processing module 1202 determines the uplink TA of the second carrier, send a preamble to the network device on the second carrier.

The terminal device further includes a receiving module 1203, configured to receive fourth indication information sent by the network device. The fourth indication information is used to indicate the uplink TA of the second carrier. The uplink TA that is of the second carrier and that is indicated by the fourth indication information is determined by the network device according to a receiving status of the preamble.

The processing module 1202 is specifically configured to determine the uplink TA of the second carrier according to the fourth indication information received by the receiving module 1203.

Optionally, the sending module 1201 is specifically configured to:

after the receiving module 1203 receives a trigger command of the network device, send the preamble to the network device on the second carrier.

Optionally, the fourth indication information is in a first random access response (RAR) sent by the network device.

The first RAR is sent to the terminal device by the network device in response to the preamble, and the first RAR further includes uplink grant information.

The processing module 1202 is further configured to skip the uplink grant information or determine that an uplink grant value indicated by the uplink grant information is 0.

Optionally, the sending module 1201 is further configured to: before the processing module 1202 determines the uplink TA of the second carrier, report fifth indication information to the network device. The fifth indication information is used to indicate that, the terminal device supports two or more TAGs when the terminal device is configured with a special carrier.

For a communications standard of a wireless communications system in which the terminal device is located, refer to the wireless communications system shown in FIG. 4. For various types of the terminal device, refer to the various types of the terminal device 401 described above.

For another optional implementation of the sending module 1201, refer to a sending operation of the terminal device 401 in [Optional solution for determining a TA] in the wireless communications system shown in FIG. 4. For another optional implementation of the processing module 1202, refer to processing and control operations of the terminal device 401 in [Optional solution for determining a TA] in the wireless communications system shown in FIG. 4. For another optional implementation of the receiving module 1203, refer to a receiving operation of the terminal device 401 in [Optional solution for determining a TA] in the wireless communications system shown in FIG. 4. For an optional implementation of determining a TA by the processing module 1202, refer to the solution for determining a TA by the terminal device 401 in [Optional solution for determining a TA] in the wireless communications system shown in FIG. 4.

The sending module 1201 may be implemented by a transmitter. The processing module 1202 may be implemented by a processor. The receiving module 1203 may be implemented by a receiver.

Figure 13:
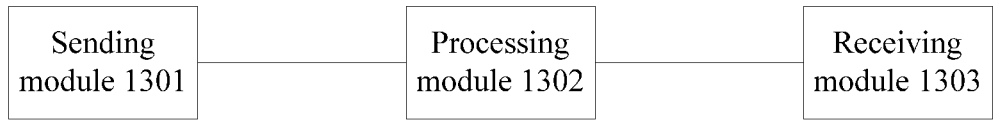
FIG. 13 is a schematic structural diagram of a second network device according to an embodiment of the present disclosure.

FIG. 13 is a schematic structural diagram of a second network device according to an embodiment of the present disclosure. As shown in FIG. 13, the network device includes:

a receiving module 1303, configured to receive a preamble sent by a terminal device on a second carrier; and a processing module 1302, configured to determine an uplink timing advance (TA) of the second carrier according to a receiving status of the preamble received by the receiving module 1303.

The second carrier is a carrier on which the terminal device sends neither uplink data nor uplink control information in uplink.

Optionally, the network device further includes a sending module 1301, and the sending module 1301 is configured to:

after the processing module 1302 determines the uplink TA of the second carrier according to the receiving status of the preamble received by the receiving module 1303, send fourth indication information to the terminal device, where the fourth indication information is used to indicate the uplink TA of the second carrier.

Optionally, the sending module 1301 is further configured to:

before the receiving module 1303 receives the preamble sent by the terminal device on the second carrier, send a trigger command to the terminal device, where the trigger command is used to trigger the terminal device to send the preamble on the special carrier.

Optionally, the receiving module 1303 is further configured to:

before the sending module 1301 sends the trigger command to the terminal device, receive fifth indication information sent by the terminal device, where the fifth indication information is used to indicate that, the terminal device supports two or more timing advance groups (TAGs) when the terminal device is configured with the special carrier.

For a communications standard of a wireless communications system in which the network device is located, refer to the wireless communications system shown in FIG. 4. For various types of the network device, refer to the various types of the network device 402 described above.

For another optional implementation of the sending module 1301, refer to a sending operation of the network device 402 in [Optional solution for determining a TA] in the wireless communications system shown in FIG. 4. For another optional implementation of the processing module 1302, refer to processing and control operations of the network device 402 in [Optional solution for determining a TA] in the wireless communications system shown in FIG. 4. For another optional implementation of the receiving module 1303, refer to a receiving operation of the network device 402 in [Optional solution for determining a TA] in the wireless communications system shown in FIG. 4. For an optional implementation of determining a TA by the processing module 1302, refer to the solution for determining a TA by the network device 402 in [Optional solution for determining a TA] in the wireless communications system shown in FIG. 4.

The sending module 1301 may be implemented by a transmitter. The processing module 1302 may be implemented by a processor. The receiving module 1303 may be implemented by a receiver.

Figure 14:
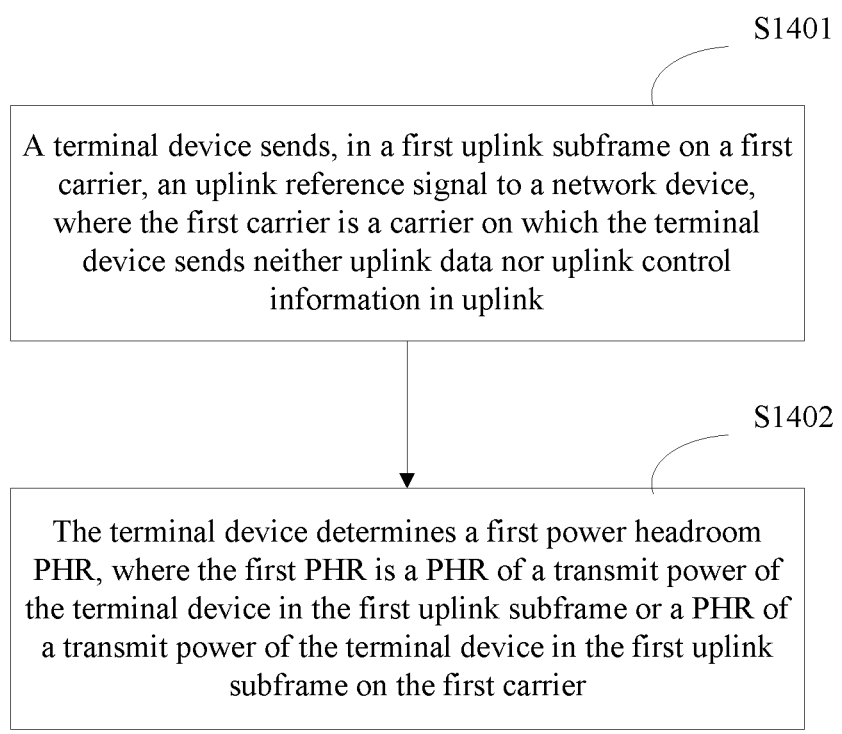
FIG. 14 is a flowchart of a first uplink reference signal sending method according to an embodiment of the present disclosure.

FIG. 14 is a flowchart of a first uplink reference signal sending method according to an embodiment of the present disclosure. As shown in FIG. 14, the method includes the following steps.

S1401: A terminal device sends, in a first uplink subframe on a first carrier, an uplink reference signal to a network device, where the first carrier is a carrier on which the terminal device sends neither uplink data nor uplink control information in uplink.

S1402: The terminal device determines a first power headroom PHR, where the first PHR is a PHR of a transmit power of the terminal device in the first uplink subframe or a PHR of a transmit power of the terminal device in the first uplink subframe on the first carrier.

Optionally, the determining, by the terminal device, a first PHR includes:

determining, by the terminal device, an initial power value of the uplink reference signal; and determining, by the terminal device, the first PHR according to the initial power value of the uplink reference signal.

Optionally, before the determining, by the terminal device, an initial power value of the uplink reference signal, the method further includes:

receiving, by the terminal device, first indication information sent by the access network device, where the first indication information is used to indicate the initial power value of the uplink reference signal.

The determining, by the terminal device, an initial power value of the uplink reference signal includes:

determining, by the terminal device, the initial power value of the uplink reference signal according to the first indication information.

Optionally, after the determining, by the terminal device, a first PHR, the method further includes:

sending, by the terminal device, second indication information to the network device, where the second indication information is used to indicate the first PHR.

Optionally, the first PHR is a virtual PHR.

After the determining, by the terminal device, a first PHR, the method further includes:

sending, by the terminal device, third indication information to the network device, where the third indication information is used to indicate that the PHR indicated by the second indication information is a virtual PHR.

In the method, for a communications standard of a wireless communications system in which the terminal device and the network device are located, refer to the wireless communications system shown in FIG. 4. For various types of the terminal device, refer to the various types of the terminal device 401 described above. For various types of the network device, refer to the various types of the network device 402 described above.

For another optional implementation of the method, refer to the processing, sending, and receiving operations on the terminal device 401 side in [Optional solution for determining a PHR] in the wireless communications system shown in FIG. 4. In the method, for an optional implementation of determining a PHR, refer to the solution for determining a PHR by the terminal device 401 in [Optional solution for determining a PHR] in the wireless communications system shown in FIG. 4.

Figure 15:
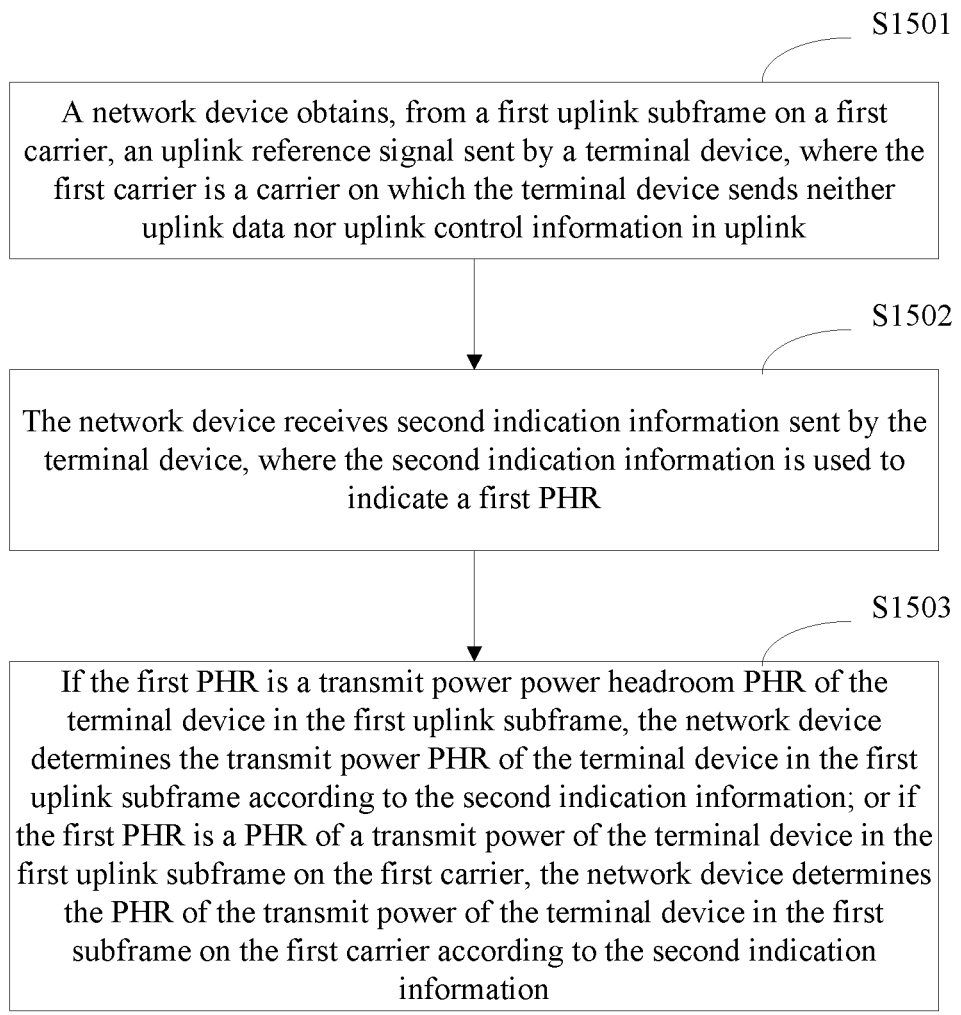
FIG. 15 is a flowchart of an uplink reference signal receiving method according to an embodiment of the present disclosure.

FIG. 15 is a flowchart of an uplink reference signal receiving method according to an embodiment of the present disclosure. As shown in FIG. 15, the method includes the following steps.

S1501: A network device obtains, from a first uplink subframe on a first carrier, an uplink reference signal sent by a terminal device, where the first carrier is a carrier on which the terminal device sends neither uplink data nor uplink control information in uplink.

S1502: The network device receives second indication information sent by the terminal device, where the second indication information is used to indicate a first PHR.

S1503. If the first PHR is a power headroom (PHR) of a transmit power of the terminal device in the first uplink subframe, the network device determines the PHR of the transmit power of the terminal device in the first uplink subframe according to the second indication information; or if the first PHR is a PHR of a transmit power of the terminal device in the first uplink subframe on the first carrier, the network device determines the PHR of the transmit power of the terminal device in the first subframe on the first carrier according to the second indication information.

Optionally, the first PHR is determined by the terminal device according to an initial power value of the uplink reference signal. Before the receiving, by the network device, first indication information, the method further includes:

sending, by the network device, first indication information to the terminal device, where the first indication information is used to indicate the initial power value of the uplink reference signal, so that the terminal device determines the initial power value of the uplink reference signal according to the first indication information.

Optionally, the first PHR is a virtual PHR, and the method further includes:

receiving, by the network device, third indication information sent by the terminal device, where the third indication information is used to indicate that the PHR indicated by the second indication information is a virtual PHR.

In the method, for a communications standard of a wireless communications system in which the terminal device and the network device are located, refer to the wireless communications system shown in FIG. 4. For various types of the terminal device, refer to the various types of the terminal device 401 described above. For various types of the network device, refer to the various types of the network device 402 described above.

For another optional implementation of the method, refer to the processing, sending, and receiving operations on the network device 402 side in [Optional solution for determining a PHR] in the wireless communications system shown in FIG. 4.

Figure 16:
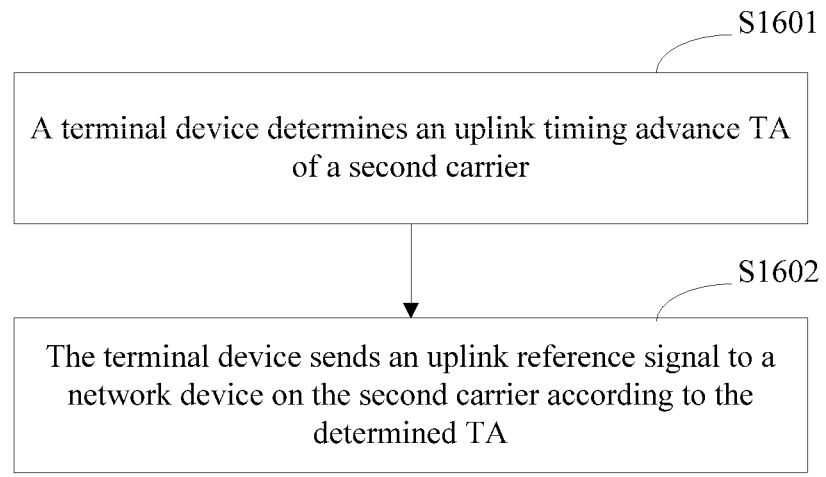
FIG. 16 is a flowchart of a second uplink reference signal sending method according to an embodiment of the present disclosure.

FIG. 16 is a flowchart of a second uplink reference signal sending method according to an embodiment of the present disclosure. As shown in FIG. 16, the method includes the following steps.

S1601: A terminal device determines an uplink timing advance (TA) of a second carrier.

S1602: The terminal device sends an uplink reference signal to a network device on the second carrier according to the determined TA.

The second carrier is a carrier on which the terminal device sends neither uplink data nor uplink control information in uplink.

Optionally, before the determining, by a terminal device, an uplink TA of a second carrier, the method further includes:

sending, by the terminal device, a preamble to the network device on the second carrier; and receiving, by the terminal device, fourth indication information sent by the network device, where the fourth indication information is used to indicate the uplink TA of the second carrier, and the uplink TA that is of the second carrier and that is indicated by the fourth indication information is determined by the network device according to a receiving status of the preamble.

The determining, by a terminal device, an uplink TA of a second carrier includes: determining, by the terminal device, the uplink TA of the second carrier according to the received fourth indication information.

Optionally, the sending, by the terminal device, a preamble to the network device on the second carrier includes:

after receiving a trigger command of the network device, sending, by the terminal device, the preamble to the network device on the second carrier.

Optionally, the fourth indication information is in a first random access response (RAR) sent by the network device.

The first RAR is sent to the terminal device by the network device in response to the preamble, and the first RAR further includes uplink grant information.

The method further includes: skipping, by the terminal device, the uplink grant information or determining that an uplink grant value indicated by the uplink grant information is 0.

Optionally, before the determining, by a terminal device, an uplink TA of a second carrier, the method further includes:

reporting, by the terminal device, fifth indication information to the network device, where the fifth indication information is used to indicate that, the terminal device supports two or more TAGs when the terminal device is configured with the special carrier.

In the method, for a communications standard of a wireless communications system in which the terminal device and the network device are located, refer to the wireless communications system shown in FIG. 4. For various types of the terminal device, refer to the various types of the terminal device 401 described above. For various types of the network device, refer to the various types of the network device 402 described above.

For another optional implementation of the method, refer to the processing, sending, and receiving operations of the terminal device 401 in [Optional solution for determining a TA] in the wireless communications system shown in FIG. 4. For an optional implementation of determining a TA by the terminal device, refer to the solution for determining a TA by the terminal device 401 in [Optional solution for determining a TA] in the wireless communications system shown in FIG. 4.

Figure 17:
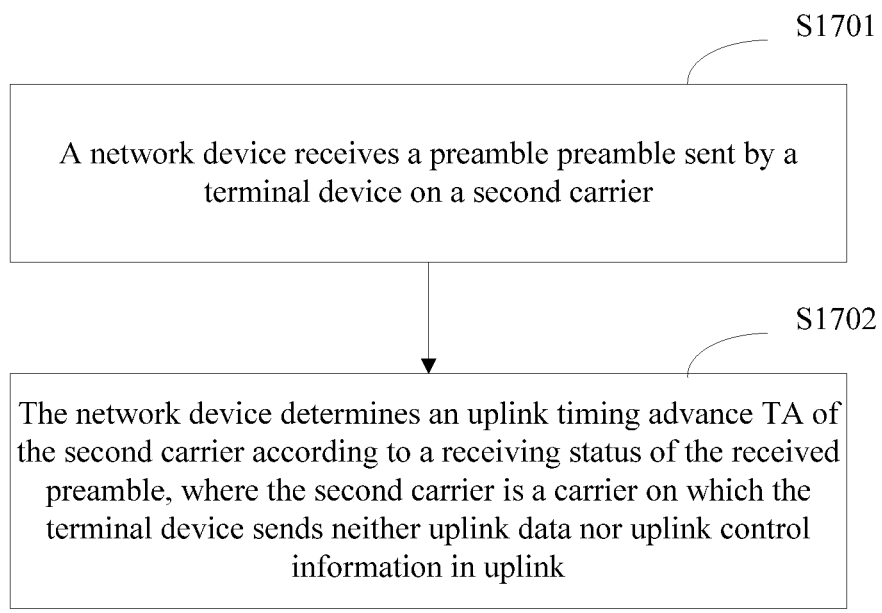
FIG. 17 is a flowchart of a TA determining method according to an embodiment of the present disclosure.

FIG. 17 is a flowchart of a TA determining method according to an embodiment of the present disclosure. As shown in FIG. 17, the method includes the following steps.

S1701: A network device receives a preamble sent by a terminal device on a second carrier.

S1702: The network device determines an uplink timing advance (TA) of the second carrier according to a receiving status of the received preamble.

The second carrier is a carrier on which the terminal device sends neither uplink data nor uplink control information in uplink.

Optionally, after the determining, by the network device, an uplink TA of the second carrier according to a receiving status of the received preamble, the method further includes:

sending, by the network device, fourth indication information to the terminal device, where the fourth indication information is used to indicate the uplink TA of the second carrier.

Optionally, before the receiving, by a network device, a preamble sent by a terminal device on a second carrier, the method further includes:

sending a trigger command to the terminal device, where the trigger command is used to trigger the terminal device to send the preamble on the special carrier.

Optionally, before the sending, by the network device, a trigger command to the terminal device, the method further includes:

receiving, by the network device, fifth indication information sent by the terminal device, where the fifth indication information is used to indicate that, the terminal device supports two or more timing advance groups (TAGs) when the terminal device is configured with the special carrier.

In the method, for a communications standard of a wireless communications system in which the terminal device and the network device are located, refer to the wireless communications system shown in FIG. 4. For various types of the terminal device, refer to the various types of the terminal device 401 described above. For various types of the network device, refer to the various types of the network device 402 described above.

For another optional implementation of the method, refer to the processing, sending, and receiving operations of the network device 402 in [Optional solution for determining a TA] in the wireless communications system shown in FIG. 4. For an optional implementation of determining a TA by the network device, refer to the solution for determining a TA by the network device 402 in [Optional solution for determining a TA] in the wireless communications system shown in FIG. 4.

In conclusion, in the embodiments of the present disclosure, special carriers are introduced, and uplink reference signals are sent on the special carriers, so that information, such as downlink channel characteristics, of these special carriers can be obtained by the network device.

In addition, both a solution for determining a PHR of a special carrier used to send an uplink reference signal and a solution for determining an uplink TA of a special carrier used to send an uplink reference signal are provided.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, and an optical memory) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the other programmable data processing device generate an apparatus for implementing a specified function in one or more processes in the flowcharts and/or in one or more blocks in the block diagrams.

These computer program instructions may be stored in a computer readable memory that can instruct the computer or the other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may be loaded onto the computer or the other programmable data processing device, so that a series of operations and steps are performed on the computer or the other programmable device to generate computer-implemented processing. Therefore, the instructions executed on the computer or the other programmable device provide steps for implementing a specified function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the embodiments and all changes and modifications falling within the scope of the present disclosure.

Obviously, persons skilled in the art can make various modifications and variations to the embodiments of the present disclosure without departing from the scope of the embodiments of the present disclosure. The present disclosure is intended to cover these modifications and variations provided that they fall within the scope of protection defined by the following claims and their equivalent technologies.

What is claimed is:

1. A terminal device, comprising:
a receiver;
a transmitter; and
a processor;
wherein the receiver is configured to receive, from a network device, a first indication information indicating an initial power value of an uplink reference signal to be sent to the network device;
wherein the transmitter is configured to send, in a first uplink subframe on a first carrier in an uplink, the uplink reference signal to the network device based on the initial power value, wherein the first carrier is a carrier on which the terminal device sends neither uplink data nor uplink control information in the uplink;
wherein the processor is configured to determine a first power headroom (PHR) based on the initial power value of the uplink reference signal in the first uplink subframe on the first carrier in the uplink, wherein the first PHR is a PHR of a transmit power of the terminal device in the first uplink subframe or a PHR of a transmit power of the terminal device in the first uplink subframe on the first carrier, wherein the first PHR is further determined based on a plurality of additional factors, including a sound reference signal (SRS) trigger type, a SRS bandwidth, an initial target power of the SRS, and a path loss.

2. The terminal device according to claim 1,
wherein the processor is configured to determine the initial power value of the uplink reference signal according to the first indication information.

3. The terminal device according to claim 1, wherein the transmitter is further configured to:
send a second indication information to the network device, wherein the second indication information is used to indicate the first PHR.

4. The terminal device according to claim 3,
wherein the first PHR is a virtual PHR; and
wherein the transmitter is further configured to:
after the processor determines the first PHR, send a third indication information to
the network device, wherein the third indication information is used to indicate that the PHR indicated by the second indication information is a virtual PHR.

5. The terminal device according to claim 1, wherein
the terminal device receives the first indication information from a radio resource control (RRC) signaling layer.

6. The terminal device according to claim 1, wherein when the first PHR is the PHR of the transmit power of the terminal device in the first uplink subframe, a plurality of carriers used by the terminal device are to send uplink reference signals in the first uplink subframe.

7. The terminal device according to claim 1, wherein when the first PHR is the PHR of the transmit power of the terminal device in the first uplink subframe on the first carrier, only one carrier used by the terminal device is to send an uplink reference signal in the first uplink subframe.

8. The terminal device according to claim 1,
wherein the uplink data includes physical layer data, service data and higher layer signaling; and
wherein the uplink control information includes physical layer control information.

9. A network device, comprising:
a receiver; and
a processor;
wherein the receiver is configured to send, to a terminal device, a first indication information indicating an initial power value of an uplink reference signal, obtain, in a first uplink subframe on a first carrier in an uplink, the uplink reference signal sent by the terminal device based on the initial power value, wherein the first carrier is a carrier on which the terminal device sends neither uplink data nor uplink control information in the uplink; and
wherein the receiver is further configured to receive a second indication information sent by the terminal device, wherein the second indication information is used to indicate a first power headroom (PHR), wherein the first PHR is determined by the terminal device according to the initial power value of the uplink reference signal;
wherein the first PHR is a PHR of a transmit power of the terminal device in the first uplink subframe, and wherein the processor is configured to determine the PHR of the transmit power of the terminal device in the first uplink subframe according to the second indication information; or
wherein the first PHR is a PHR of a transmit power of the terminal device in the first uplink subframe on the first carrier, and wherein the processor is configured to determine the PHR of the transmit power of the terminal device in the first subframe on the first carrier according to the second indication information; and
wherein the first PHR is further determined based on a plurality of additional factors, including a sound reference signal (SRS) trigger type, a SRS bandwidth, an initial target power of the SRS, and a path loss.

10. The network device according to claim 9, wherein the first PHR is a virtual PHR, and the receiver is further configured to:
receive a third indication information sent by the terminal device, wherein the third indication information is used to indicate that the PHR indicated by the second indication information is a virtual PHR.

11. An uplink reference signal sending method, comprising:
receiving, by a terminal device, a first indication information from a network device, the first indication information indicating an initial power value of an uplink reference signal to be sent to the network device;
sending, by the terminal device in a first uplink subframe on a first carrier in an uplink, the uplink reference signal to the network device, wherein the first carrier is a carrier on which the terminal device sends neither uplink data nor uplink control information in the uplink; and
determining, by the terminal device, a first power headroom (PHR) based on the initial power value of the uplink reference signal in the first uplink subframe on the first carrier in the uplink, wherein the first PHR is a PHR of a transmit power of the terminal device in the first uplink subframe or a PHR of a transmit power of the terminal device in the first uplink subframe on the first carrier, wherein the first PHR is further determined based on a plurality of additional factors, including a sound reference signal (SRS) trigger type, a SRS bandwidth, an initial target power of the SRS, and a path loss.

12. The method according to claim 11,
wherein the determining, by the terminal device, the initial power value of the uplink reference signal comprises: determining, by the terminal device, the initial power value of the uplink reference signal according to the first indication information.

13. The method according to claim 11, wherein after the determining, by the terminal device, the first PHR, the method further comprises:
sending, by the terminal device, a second indication information to the network device, wherein the second indication information is used to indicate the first PHR.

14. The method according to claim 13,
wherein the first PHR is a virtual PHR; and
wherein after the determining, by the terminal device, the first PHR, the method further comprises: sending, by the terminal device, a third indication information to the network device, wherein the third indication information is used to indicate that the PHR indicated by the second indication information is a virtual PHR.

15. The method according to claim 11, wherein the terminal device receives the first indication information from a radio resource control (RRC) signaling layer.

16. The method according to claim 11, wherein when the first PHR is the PHR of the transmit power of the terminal device in the first uplink subframe, a plurality of carriers used by the terminal device are to send uplink reference signals in the first uplink subframe.

17. The method according to claim 11, wherein when the first PHR is the PHR of the transmit power of the terminal device in the first uplink subframe on the first carrier, only one carrier used by the terminal device is to send an uplink reference signal in the first uplink subframe.

18. The method according to claim 11,
wherein the uplink data includes physical layer data, service data and higher layer signaling; and
wherein the uplink control information includes physical layer control information.

* * * * *